United States Patent [19]
Diehl

[11] 3,708,754
[45] Jan. 2, 1973

[54] PROCESS CONTROLLER WITH GAIN-CHANGING CIRCUITRY

[75] Inventor: Elmer Paul Diehl, Wakefield, Mass.

[73] Assignee: General Electric Company, Lynn, Mass.

[22] Filed: Oct. 16, 1970

[21] Appl. No.: 81,462

[52] U.S. Cl. ................... 330/1 A, 318/619, 330/28, 330/29, 330/86
[51] Int. Cl. ............................................. H03g 3/30
[58] Field of Search ........... 330/28, 29, 86, 110, 1 A; 318/615–619

[56] References Cited

UNITED STATES PATENTS

| | | | |
|---|---|---|---|
| 3,458,821 | 7/1969 | Clarridge | 330/86 UX |
| 3,114,869 | 12/1963 | Goodwin | 318/617 |
| 3,197,711 | 7/1965 | Richardson | 330/110 X |
| 3,028,534 | 4/1962 | Chilton | 318/617 |

OTHER PUBLICATIONS

Sedra et al.; "Simple Digitally-Controlled Variable-Gain Linear D.C. Amplifier," Electronic Engineering, March 1969, pp. 362–365.

*Primary Examiner*—Roy Lake
*Assistant Examiner*—James B. Mullins
*Attorney*—William S. Wolfe, Frank L. Neuhauser, Oscar B. Waddell and Joseph B. Forman

[57] ABSTRACT

A process controller having gain-changing circuitry in a negative feedback loop for a controller amplifier for changing the controller gain as a function of controller output. A pair of resistors form a voltage divided connected between the output and a variable voltage source. The variable voltage source is adjusted to the desired value of the output at which the controller is to change gain. The voltage at the junction of the resistors is introduced to the amplifier input through a feedback impedance. A switching circuit is connected between the variable voltage source and the voltage divider. When the output voltage is less than the adjustable variable voltage, the switch is open and a first proportion of the output voltage is introduced to the feedback impedance. When the output voltage is greater than the adjusted variable voltage, the switch is closed causing the voltage divider to be conductive, thereby introducing a second proportion of the output voltage to the feedback impedance.

9 Claims, 8 Drawing Figures

PATENTED JAN 2 1973　　　　　　　　　　　　　　3,708,754

INVENTOR:
ELMER P. DIEHL,

BY Gerald R. Woods
HIS ATTORNEY.

INVENTOR:
ELMER P. DIEHL,

BY Gerald R. Woods
HIS ATTORNEY.

PROCESS CONTROLLER WITH GAIN-CHANGING CIRCUITRY

BACKGROUND OF THE INVENTION

The present invention relates to process control devices and, more particularly, to a process controller capable of operating at different values of gain.

In a closed loop process control system using analog process controllers, selected process characteristics or variables are monitored by transducers, each of which generates a process variable signal having a magnitude proportional to the magnitude of a particular variable. The process variable signal is compared to a setpoint signal proportional to a desired magnitude for that variable. This comparison takes place in a process controller which may be connected to a process-affecting device through a suitable transducer. The process-affecting device, which can be a valve in a fuel line or the like, alters the level of operation of the process to drive the process variable toward its setpoint.

Process controllers can be classified according to the characteristics of the output signals which are generated following a change in the input signal. In a single mode controller, the change in the output is proportional to the change in the input. In a two-mode controller, the output change is the algebraic sum of two components, a proportional component and a reset or integral component. The proportional component is the same as in a single mode controller. The reset component is equal to the time integral of the deviation between the process variable and the setpoint signal. In a three-mode controller, the output signal has proportional and reset components and additionally has a rate component proportional to the derivative with respect to time of either the deviation between the process variable and the setpoint signal or the process variable signal alone.

The gain of a typical controller is established by means of negative feedback from the controller output to the controller input. Typically, current supplied to a controller load element is routed through a serially-connected feedback resistor. The voltage developed across this resistor is fed back to an input to a controller amplifier to limit gain.

For some types of processes, the controller output must be maintained at a maximum during startup but must be decreased to a fraction of that maximum following startup to hold the process at a desired level of steady state operation. The decrease must occur quickly and at the correct time during startup to prevent the process variable from overshooting its setpoint. If overshoot does occur, the process requires more time to settle down to the setpoint, leading to loss of production time or inferior product quality during the initial phases of the process. The controller also must be able to respond satisfactorily to small-signal process disturbances encountered during normal steady-state operation.

To meet the requirements of maximum output during startup, rapid reduction to a steady state maintaining level without process overshoot, and satisfactory response to small signal disturbances, special process control systems have been constructed using a number of process controllers having different gains. At predetermined levels of operation, control of the process is automatically shifted from one process controller to another, thereby changing the gain of the system as a function of output. Although the performance of such a multiple-controller system is satisfactory for batch processes, the system is relatively costly due to the added cost of the extra controllers.

To avoid the added costs inherent in the multiple-controller arrangement, attempts have been made to use a single controller.

According to one approach, the proportional band is manually changed following startup to reduce the gain of the controller Of course, an operator must be present to carry out this change. An inexperienced or an experienced but inattentive operator may not make the proportional band change at the correct time causing a bump in the controller output. Other circuits have been used in which the proportional band of the controller is automatically shifted below the setpoint whenever the controller is in saturation.

According to another approach, process overshoot during startup can be minimized by providing a rate circuit which responds to the rate of change of the process variable even when the controller is in saturation. Under such conditions, the circuit acts as a rate of approach circuit and may be made more effective by increasing the reset time. However, the increased reset time adds to the time required for the process to settle down to the steady-state level of operation and also increases the amount of time required for the process to recover following disturbances during steady-state operation.

It has been found that the addition of rate or derivative action in a single controller may decrease the time required for the controller to bring the process to the steady-state level of operation. However, it has also been found that the addition of the rate action may cause instability in the process following disturbances during steady-state operation.

SUMMARY OF THE INVENTION

The present invention is a multiple-gain process controller which has high gain during startup, which rapidly reduces its output to avoid overshoot as the process approaches a steady-state level of operation, and which automatically reduces gain to a level which assures satisfactory controller response to small signal disturbances encountered during steady-state operation. The invention lacks the cost and complexity of multiple-controller systems and the compromised characteristics found in previously known single controller systems.

The invention includes a process controller having an amplifier with an error signal input based on the difference between the setpoint signal and the process variable signal and an output signal which controls a process-affecting device. Means for automatically changing the gain of the amplifier as a function of its output are provided in a negative feedback loop. The gain-changing means includes first and second serially-connected impedances. A feedback amplifier drives one end of the first impedance with a voltage proportional to the controller output. The other end of the second impedance is connected to the variable voltage source through a switch. The voltage at the junction of the impedance is introduced into the input of the controller amplifier through a feedback impedance. When the output of the feedback amplifier is less than the adjusted variable voltage, the switch is open and a first proportion of the controller output voltage is introduced to the feedback impedance. When the feedback amplifier voltage is greater than the adjusted variable voltage, the switch is closed, causing the voltage divider to be conductive, thereby introducing a second proportion of the controller output voltage to the feedback network.

DESCRIPTION OF THE DRAWINGS

While the specification concludes with claims particularly pointing out distinctly claiming that which is regarded as the present invention, certain details of a preferred embodiment of the invention may be more readily ascertained from the following detailed description when read in conjunction with the accompanying drawings in which:

DETAILED DESCRIPTION

Figure 1:
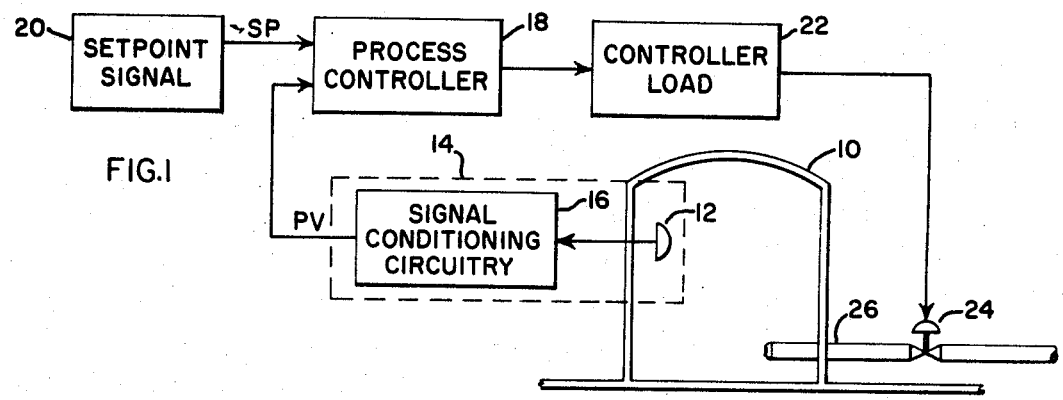
FIG. 1 is a block diagram of a typical closed loop process control system utilizing a process controller.

FIG. 1 shows the basic elements of a closed loop process control system used to control the temperature in a furnace 10. The furnace temperature is monitored by a thermally responsive element 12 in a thermal-to-electrical transducer 14 including signal conditioning circuitry 16. The electrical signal generated by the transducer 14 is called a process variable or PV signal and is applied to one input of a process controller 18 having a second input SP from a setpoint signal source 20. In a typical controller, the setpoint signal source is part of the internal controller circuitry. For purposes of illustration, the source 20 has been represented as an independent element external to the controller. Since the setpoint signal equals the signal which would be generated by the transducer 14 if the furnace temperature were at a desired or setpoint level, the difference between the setpoint signal and the process variable signal represents an error in temperature in the furnace 10. When the comparison reveals a temperature error, the process controller 18 generates an output signal which is applied to a controller load 22. In the embodiment shown, controller load 22 is an electrical-to-mechanical transducer coupled to a valve 24 in a fuel line 26 for furnace 10. The signal applied to load 22 ultimately causes the position of valve 24 to be changed to adjust flow of fuel into furnace 10 in a direction which drives the furnace temperature toward its setpoint.

Figure 2A:
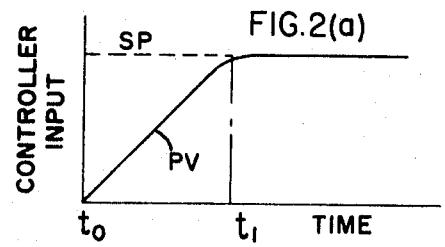
FIGS. 2A and 2B are graphs of controller input and controller output, respectively, with respect to time for a typical process during startup.
Figure 2B:
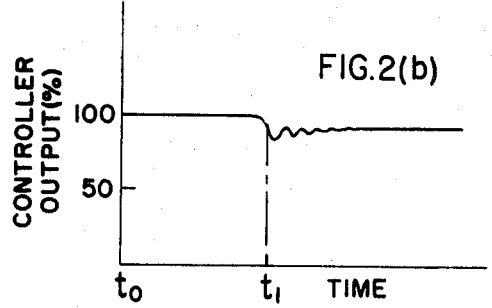

Referring to FIGS. 2A and 2B, during the startup of a process, the process variable signal differs from the setpoint signal by an amount which causes a process controller to produce a maximum output over a period of time extending from a time $t_0$ to a time $t_1$. In FIG. 2B, the maximum output is represented by the straight line at a 100 percent level. Referring to FIG. 2A, the maximum output causes the process and consequently the process variable signal PV to increase toward a previously established setpoint. As the process variable signal PV approaches the setpoint signal SP for a common continuous process, the controller output is reduced from its startup output level since less energy is required to maintain the process at a desired operating level than is required to bring the process rapidly to that operating level.

Figure 3A:
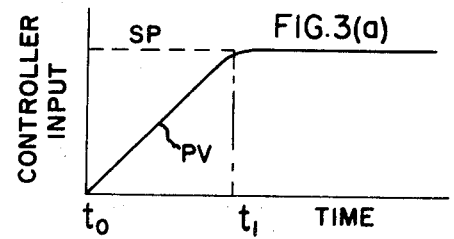
FIGS. 3A and 3B are graphs of controller input and controller output, respectively, for a common type of batch process during startup.
Figure 3B:
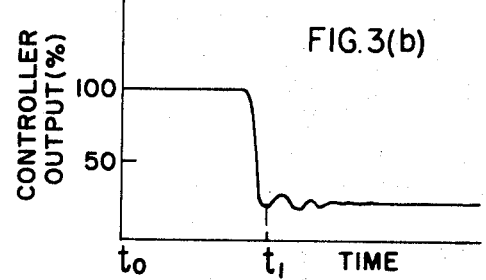

In certain types of batch processes, the controller output required to maintain the process at a desired operating level is several times less than controller output needed to bring that process quickly to that desired operating level. This is shown in FIGS. 3A and 3B wherein the controller output during the startup of a batch process is at a 100 percent level until the process variable signal PV approaches the setpoint signal SP at the time $t_1$. At that time, the output of the controller 18 must be quickly reduced to reduce the energy supplied to the process to avoid overshoot. For the type of batch process just described, the energy level required to maintain a process at a level of operation may be on the order of 20–25 percent of the energy level required to bring the process rapidly to that operating level.

An example of a batch process of the type described is a fabric heat-treating oven wherein air must be heated to within several degrees of a flow point of a fabric within a relatively short time in order to maximize production. Once the air has been heated to a desired temperature by a maximum fuel input to the oven, the fuel input can be reduced on the order of 75 percent while still maintaining the desired temperature level.

Figure 4:
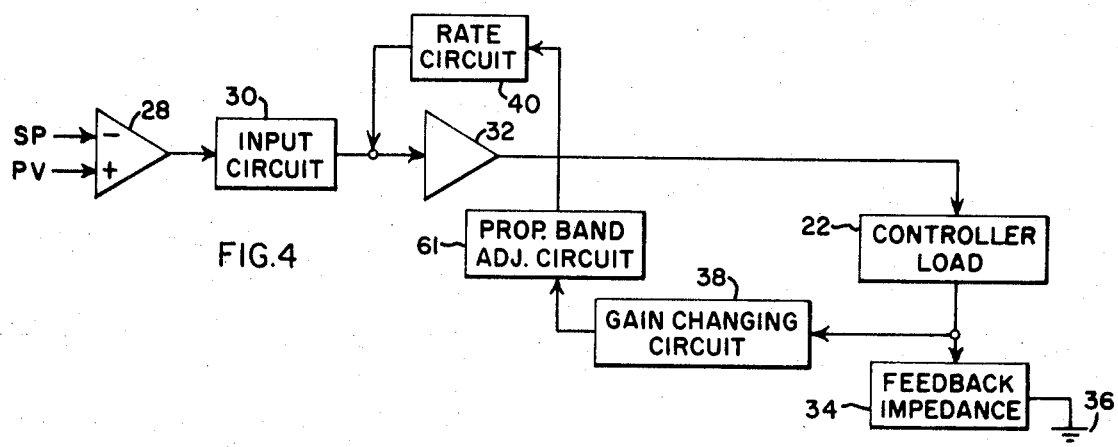
FIG. 4 is a block diagram of the present invention.

In order to provide high controller output during startup and satisfactory controller response to the small signal disturbances normally encountered during steady state operation, a process controller constructed in accordance with the present invention has different values of gain at different levels of output. Referring to FIG. 4, a process variable signal PV and a setpoint signal SP are applied to complementary inputs of a differential amplifier 28. The output of the differential amplifier 28 is a difference or error signal that may be applied through an input circuit 30, described in detail below, to an input of an amplifier 32 which generates a signal having proportional and integral components. The output of amplifier 32 is applied to controller load 22. A negative feedback loop for the amplifier 32 is connected to a feedback impedance 34, preferably a resistor, connected in series with the controller load 22 to form a controller load circuit between the output of amplifier 32 and a common terminal 36. The triangular symbol representing the common terminal 36 also appears in FIGS. 5 and 6. It is to be understood that this symbol represents a uniform electrical potential wherever it appears in the drawings.

The voltage across feedback resistor 34 is applied to a gain-changing circuit 38 in a negative feedback loop for amplifier 32. The feedback loop includes a proportional band adjustment circuit 61 which is described in detail below. Where the controller signal is to have a derivative component, the feedback is applied to a rate circuit 40. The rate circuit 40 is optional and can be eliminated in some process control applications by short circuiting. When the output of the amplifier 32 is within a certain range of values, gain-changing circuit 38 establishes a first ratio of feedback to amplifier output. If the output of the amplifier 32 is within a second range of values, gain-changing circuit 38 automatically provides a second ratio of feedback to amplifier output. These different ratios of feedback to output alter the effective gain from the input of the amplifier 32 through the controller load.

Figure 5:
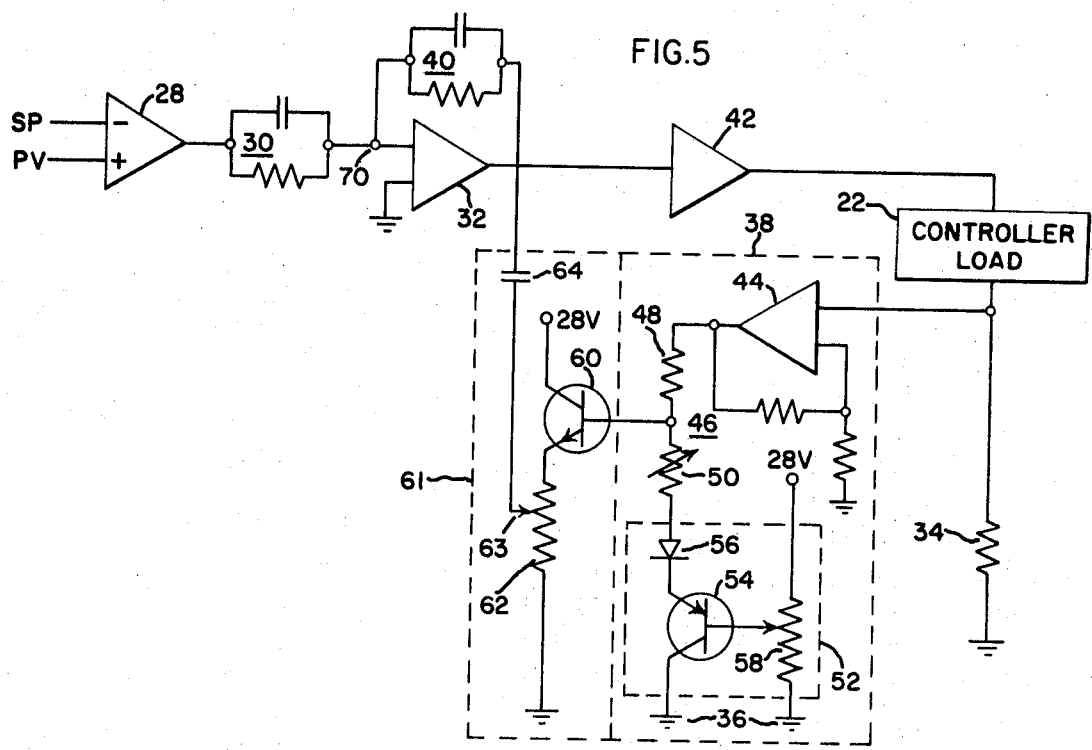
FIG. 5 is a more detailed schematic diagram showing an increased output-increased gain embodiment of the present invention.
Figure 6:
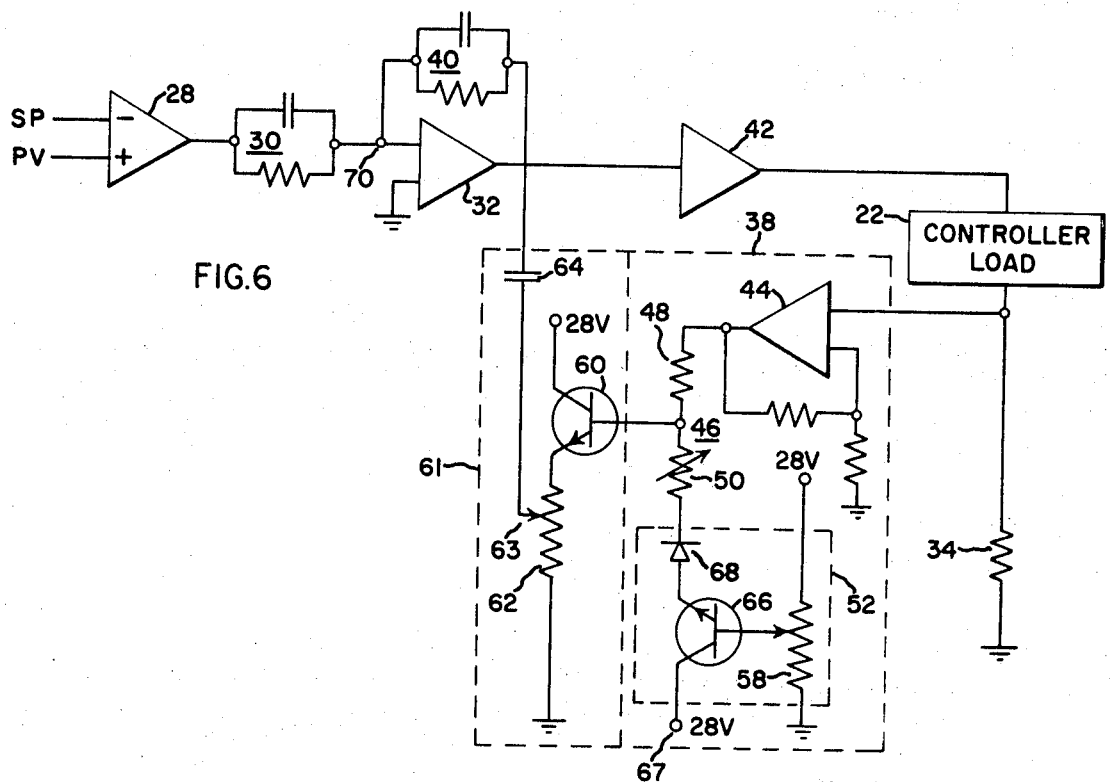
FIG. 6 is a schematic diagram showing an increased output-decreased gain embodiment of the present invention.

Depending on the characteristics of the process being controlled, gain-changing circuit 38 may be configured to provide increased controller gain at higher levels of controller output or decreased controller gains at higher levels of controller output. FIG. 5 shows a gain-changing circuit for altering controller gain as a direct function of controller output. Many of the elements shown in FIG. 5 appear in block diagram form in FIG. 4 or in schematic diagram form in FIG. 6. When an element is common to more than one figure, the same numerical designation is applied to that element wherever it appears.

Referring to FIG. 5, the difference signal at the output of the differential amplifier 28 is applied through the input circuit 30, consisting of a parallel resistor-capacitor circuit, to an input to amplifier 32. A second input to the amplifier 32 is connected to the common terminal. The output of the amplifier 32 is applied to a current amplifier 42, having its own output connected to the controller load 22. The voltage across feedback resistor 34 is applied to one input of a feedback amplifier 44 in the gain-changing circuit 38. The output of the feedback amplifier 44 is applied to a voltage divider 46 including a first impedance 48 connected to the feedback amplifier 44. A second impedance 50 in voltage divider 46 is selectively connected to a variable voltage source through transistor switching means 52 including a PNP transistor 54 having a protecting diode 56 in its emitter circuit. The collector of the PNP transistor 54 is tied to the common terminal and the variable voltage source is applied to the base terminal of the PNP transistor 54 through a potentiometer 58 connected between a positive voltage source and the common terminal.

The junction of resistors 48 and 50 is connected to the base of an NPN transistor 60 which introduces a feedback voltage to feedback potentiometer 62. The voltage appearing across the potentiometer 62 is directly related to the feedback voltage appearing at the base terminal of the NPN transistor 60. The voltage at tap 63 is applied through a feedback capacitor 64 in adjustment circuit 61 to the rate circuit 40 consisting of a parallel resistor-capacitor arrangement. The feedback current at the left side of the rate circuit 40 is summed at a summing junction 70 with the current at the output of the circuit 30. Since the feedback is out of phase with the input current from the circuit 30, the gain of the amplifier 32 is a function of the ratio of feedback to controller output.

The circuit described above operates in the following manner to increase the gain of the controller at higher levels of controller output. When the output of the controller is less than a predetermined value, the feedback voltage at the junction of resistors 48 and 50 is lower than the base voltage of the PNP transistor 54. Transistor 54 does not conduct in this lower range of controller output and, therefore, open circuits the connection between the impedance 50 and the common terminal 36. With impedance 50 open circuited, the voltage at the junction of resistors 48 and 50 equals the voltage at the output of feedback amplifier 44. This voltage biases transistor 60 to a highly conductive state in which the voltage at the output of feedback amplifier 44 is effectively imposed on potentiometer 62. Due to the relatively high negative feedback voltage at the lower levels of controller output, the amplifier 32 will have a relatively low gain which assures system stability when the controller responds to small signal disturbances encountered during steady state operation.

During startup, on the other hand, the considerable difference between the process variable signal PV and the setpoint signal SP causes the amplifier 32 to generate a large output. When the high output current is applied to controller load 22 and feedback resistor 34, the feedback voltage at the output of the feedback amplifier 44 drives the voltage at the junction of the resistors 48 and 50 to a level exceeding the base bias voltage on the PNP transistor 54. That transistor is driven into conduction and a voltage very nearly equal to the variable voltage source is applied to the lower end of impedance 50. Under these conditions, the resistor 50 acts as a current shunt which reduces the proportion of the output voltage of feedback amplifier 44 applied to the NPN transistor 60. Due to this relatively low negative feedback voltage, the ratio of negative feedback voltage to controller output is reduced and the gain of the controller shifts toward the open loop gain. The value to which the gain is increased is a function of the value of the resistor 50 which is preferably an adjustable resistor.

The characteristics of some types of processes make it desirable to decrease the gain of a process controller at higher levels of controller output. The circuit shown in FIG. 6 may be used to accomplish this purpose. This circuit is similar to the circuit shown in FIG. 5, differing only in the configuration of the gain-changing circuit. In the embodiment shown in FIG. 6, the transistor switching means 52 includes an NPN transistor 66 having its collector connected to a positive voltage 67 and its emitter connected to the anode of a protecting diode 68. The cathode of the diode 68 is connected to the lower end of the second impedance 50 in the voltage divider 46. When the feedback voltage at the output of the feedback amplifier 44, or more specifically at the base of the transistor 60, is less than the bias voltage on the base of NPN transistor 66, transistor 66 conducts. The current produced in the voltage divider 46 by the positive voltage 67 opposes the feedback current and reduces the current applied to the base of transistor 60. This reduction in base current results in a lower ratio of feedback voltage to controller output and, consequently, in a higher controller gain.

When the controller output is relatively high, the high feedback voltage at the junction of the resistors 48 and 50 tends to bias the transistor 66 into non-conduction. Thus, the transistor 66 effectively forms an open circuit between the impedance 50 and the positive voltage source 67. With resistor 50 open circuited, the feedback voltage is applied entirely to the base of the transistor 60 to bias that transistor more heavily into conduction. The higher ratio of feedback voltage reduces the effective gain of the controller at higher levels of controller output.

While there have been described what are believed to be preferred embodiments of the present invention, variations and modifications therein will occur to those skilled in the art once they become familiar with the invention. For example, it will be appreciated that the invention may be used wherever the multiple-gain characteristics are desirable and not only during startup of certain types of batch processes. Therefore, it is intended that the appended claims shall be construed to include all such variations and modifications as fall within the true spirit and scope of the invention.

I claim:

1. A multiple-gain process controller having input terminals adapted to be connected to sources of setpoint and process variable signals and an output terminal connected to a controller load circuit, said controller comprising:
   a. means for generating an error signal based on the difference between the setpoint signal and the process variable signal;
   b. amplifier means responsive to the error signal for supplying a drive current to the controller load;
   c. circuit means responsive to the drive current for generating a feedback signal, said circuit means including gain changing means having switching means responsive to a predetermined level of drive current for causing said feedback signal to be in a first proportion to the drive current when the drive current is less than a predetermined level and in a second proportion to the drive current when the drive current is greater than the predetermined level; and
   d. a feedback circuit connected to the amplifier input and responsive to the feedback signal.

2. An improved process controller having automatic gain change at a predetermined controller output level, said process controller including means for generating a setpoint signal and a process variable signal, amplifier means responsive to the difference between the setpoint signal and the process variable signal for supplying a drive current to a controller load, and a negative feedback circuit connected to the input of the amplifier, wherein the improvement comprises:
   a. first circuit means responsive to the drive current for generating a first signal proportional to said drive current;
   b. second circuit means for generating a second signal proportional to a predetermined value of the drive current; and
   c. third circuit means responsive to the first and second signals for introducing a feedback signal to the negative feedback circuit said feedback signal being in a first proportion to the drive current when the first signal is less than the second signal and in a second proportion to the drive current when the first signal is greater than the second signal, said controller having a first gain when the first signal is less than the second signal and a second gain when the first signal is greater than the second signal.

3. An improved process controller as recited in claim 2 wherein the first circuit means comprises a load sensing resistor in series with the controller load for generating a voltage proportional to the drive current and an amplifier responsive to the voltage across the load sensing resistor for generating the first signal; and wherein the second circuit means comprises a potentiometer connected to a voltage source, the second signal appearing at the arm of the potentiometer.

4. An improved process controller as recited in claim 3 wherein the third circuit means comprises:
   a. a pair of resistors serially connected as a voltage divider network, one end of said voltage divider network being driven by the first signal; and
   b. switching means for automatically connecting the other end of the voltage divider network to the second signal through a very low impedance when the first signal is greater than the second signal and through a very high impedance when the first signal is less than the second signal.

5. An improved process controller as recited in claim 4 wherein the switching means automatically connects the other end of the voltage divider network to the second signal through a very low impedance when the first signal is less than the second signal and through a very high impedance when the first signal is greater than the second signal.

6. An improved process controller as recited in claim 4 wherein the switching means comprises a transistor having a base responsive to the second signal, a collector connected to a voltage source and an emitter connected to the other end of the voltage divider network.

7. An improved process controller as recited in claim 6 wherein the feedback network comprises a proportional capacitor connected between the third signal and the amplifier input.

8. An improved process controller as recited in claim 7 wherein the feedback network additionally comprises a rate circuit.

9. An improved process controller as recited in claim 8 wherein the rate circuit comprises a rate resistor in parallel with rate capacitor connected between the amplifier input and the proportional capacitor.

* * * * *

UNITED STATES PATENT OFFICE
CERTIFICATE OF CORRECTION

Patent No. 3,708,754    Dated January 2, 1973

Inventor(s) Elmer Paul Diehl

It is certified that error appears in the above-identified patent and that said Letters Patent are hereby corrected as shown below:

In the Abstract, line 4, "divided" should be -- divider --. Column 2, line 11, after "controller" insert -- . --. Column 5, line 45, after "terminal" insert -- 36 --.

This certificate supersedes Certificate of Correction issued September 11, 1973.

Signed and sealed this 20th day of November 1973.

(SEAL)
Attest:

EDWARD M. FLETCHER, JR.
Attesting Officer

RENE D. TEGTMEYER
Acting Commissioner of Patents